A. R. SMITH.
FLOUR BOLTING MACHINE.
No. 264,353. Patented Sept. 12, 1882.
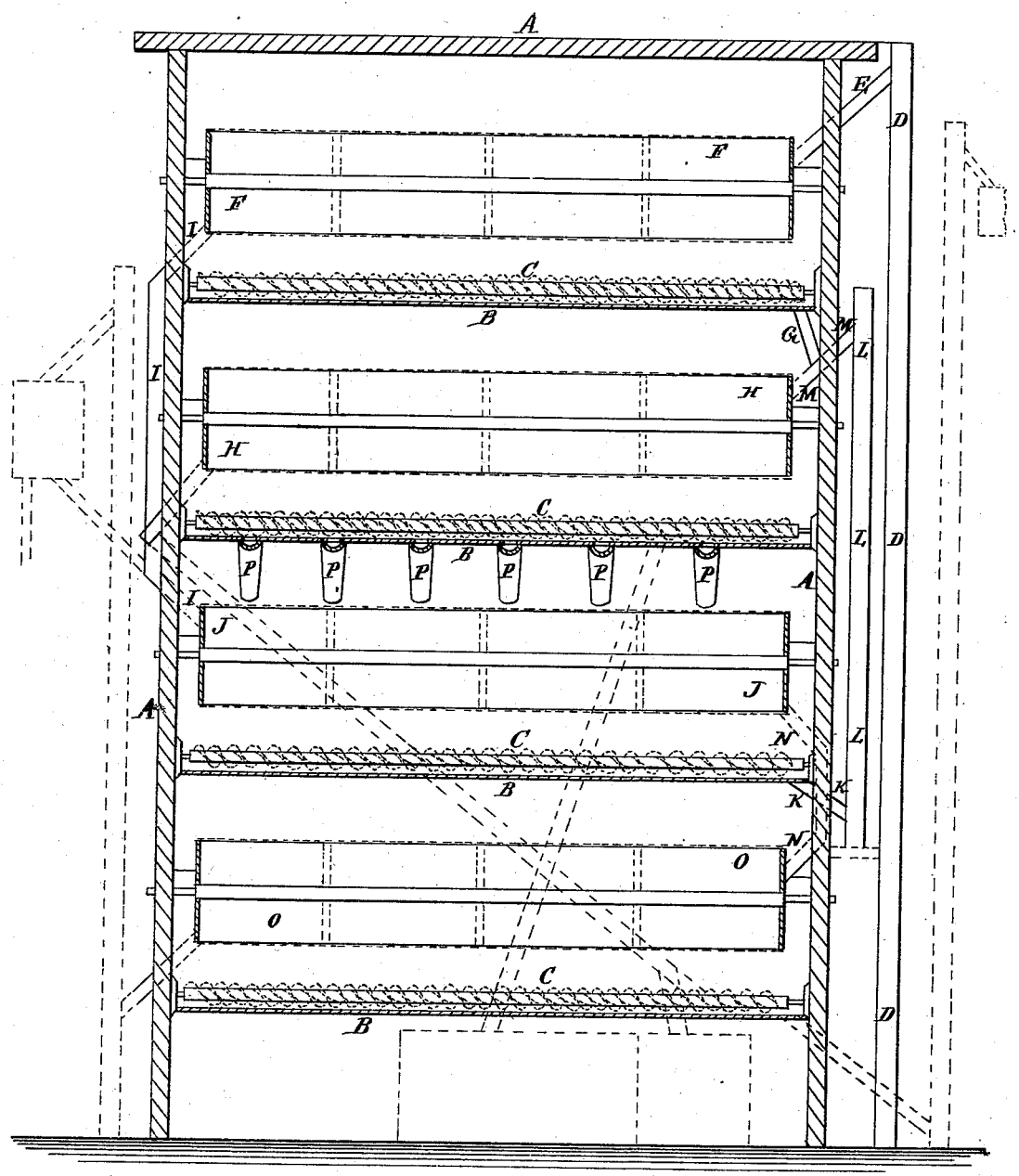
WITNESSES:
Henry N. Miller
C. Sedgwick
INVENTOR:
A. R. Smith
BY Munn & Co.
ATTORNEYS.

UNITED STATES PATENT OFFICE.

AMMI R. SMITH, OF MAROA, ILLINOIS.

FLOUR-BOLTING MACHINE.

SPECIFICATION forming part of Letters Patent No. 264,353, dated September 12, 1882.

Application filed January 24, 1880.

*To all whom it may concern:*

Be it known that I, AMMI R. SMITH, of Maroa, in the county of Macon and State of Illinois, have invented a new and useful Improvement in Flour-Bolting Machines, of which the following is a specification.

The figure is a sectional elevation of the improvement.

The object of this invention is to improve the grades of flour and increase the proportional quantity of higher-grade flour.

A represents the outer casing or frame, and B represents the inner or bolt casings. In the lower part of each bolt-casing B is placed an ordinary screw-conveyer, C, to move the flour to the discharge-openings.

D represents the main elevator, by which the chop from the millstones is carried up and discharged through a spout, E, into the upper or separating reel, F. The reel F separates the bran, red shorts, and coarse middlings from the flour and fine middlings. The flour and fine middlings that pass through the cloth of the reel F are discharged through a spout, G, into the flour-reel H. The bran, red shorts, and coarse middlings that do not pass through the cloth of the reel F are discharged through a spout, I, into the return-reel J. The flour that passes through the cloth of the reel J passes through a spout, K, into an elevator, L, separate from the main elevator D, and is discharged through a spout, M, into the flour-reel H. The bran and other material that do not pass through the cloth of the reel J are discharged through a spout, N, into the finishing-reel O. The middlings that pass through the cloth of the reel O are discharged through a spout into an elevator, by which they are conveyed to a middlings-purifier, as indicated in dotted lines at the right-hand side of the figure. The bran that does not pass through the cloth of the reel O is discharged through a spout into an elevator, and is carried to a bran-duster, from which the bran is discharged into a suitable receptacle, and the middlings are conveyed to the return-reel J, as indicated in dotted lines at the left-hand side of the drawing. The flour that passes through the cloth of the reel H is discharged into a flour bin or receiver, and the middlings that do not pass through the cloth of the reel H are discharged into a middlings bin or receiver, as indicated in dotted lines in the figure. The case B of the flour-reel H is provided with a series of discharge-spouts, P, provided with slides in the usual way for grading the flour. By this invention the grades of flour are improved, and the quantity of the higher grades is increased by taking out all the light and fluffy and coarse matter before the material is operated upon by the flour-reel.

I am aware that it is not new to place flour-reels one above another or to use spiral conveyers or bolting-cloths of varying fineness; but

What I claim is—

1. In a flour-bolting machine, the combination of a separating-reel, a return-reel, and finishing-reel, and suitable conveying devices connecting them, all arranged as described to first separate the bran, shorts, and coarse middlings from the flour and fine middlings and then to spout the shorts and coarse middlings to the return-reel, the same being carried thence to the finishing-reel, as set forth.

2. In a flour-bolting machine, the elevator L, in combination with return and flour reels and suitable cut-offs and conveying devices as described, whereby the flour is taken back from the cut-offs and from the return-reel to the flour-reel, substantially as set forth.

AMMI ROGERS SMITH.

Witnesses:
W. J. COMPTON,
BAZEL COOPER.